(12) United States Patent
Duffett-Smith et al.

(10) Patent No.: US 8,050,687 B2
(45) Date of Patent: Nov. 1, 2011

(54) LOCATION SYSTEMS AND METHODS

(75) Inventors: Peter James Duffett-Smith, Cambridge (GB); Craig Andrew Scott, Cambridge (GB); Malcolm David MacNaughtan, Sydney (AU); Guy Albert Graube, Cambridge (GB); James Paul Brice, Cambridge (GB)

(73) Assignee: Cambridge Positioning Systems Limited, Cambridge (GB)

( * ) Notice: Subject to any disclaimer, the term of this patent is extended or adjusted under 35 U.S.C. 154(b) by 1280 days.

(21) Appl. No.: 10/437,146

(22) Filed: May 14, 2003

(65) Prior Publication Data

US 2003/0220117 A1 Nov. 27, 2003

(30) Foreign Application Priority Data

May 22, 2002 (EP) .................................... 02253586

(51) Int. Cl.
*H04W 24/00* (2009.01)
*H04B 1/00* (2006.01)
*H04B 15/00* (2006.01)
*G01S 1/08* (2006.01)
*G01S 5/02* (2006.01)
*G01S 13/00* (2006.01)

(52) U.S. Cl. ............... 455/456.1; 455/456.5; 455/63.4; 342/386; 342/419; 342/147

(58) Field of Classification Search .................. 455/63.4, 455/456.1–456.6; 342/386, 149, 419
See application file for complete search history.

(56) References Cited

U.S. PATENT DOCUMENTS

| 6,094,168 | A | 7/2000 | Duffett-Smith et al. ....... 342/463 |
| 6,108,553 | A | 8/2000 | Silventoinen et al. ......... 455/456 |
| 6,240,098 | B1 * | 5/2001 | Thibault et al. ............... 370/431 |
| 6,484,031 | B1 * | 11/2002 | Ruutu et al. ............... 455/456.1 |
| 6,577,875 | B1 * | 6/2003 | Brouwer ........................ 455/522 |
| 2002/0132624 | A1 * | 9/2002 | Watanabe et al. ............ 455/456 |
| 2003/0144007 | A1 * | 7/2003 | Johansson et al. ............ 455/456 |

FOREIGN PATENT DOCUMENTS

| WO | 9921028 | 4/1999 |
| WO | 0073813 | 12/2000 |

OTHER PUBLICATIONS

Caffery et al, "Overview of Radiolocation in CDMA Cellular Systems", Apr. 1998, pp. 38-45.*

* cited by examiner

*Primary Examiner* — George Eng
*Assistant Examiner* — Wesley Kim
(74) *Attorney, Agent, or Firm* — Roylance, Abrams, Berdo & Goodman, LLP

(57) ABSTRACT

A method of calculating the position or state of motion of one or more terminals is proposed in which each has a receiver capable of making measurements of signals received from one or more transmission sources for use in calculating the unknown position or state of motion of the or each terminal. At least one transmission source has a known directional transmission pattern, and the bearing from one of the receivers of the or each of the transmission source having a known directional transmission pattern is estimated. Weights are assigned to the measurements made by the one receiver, the weights being calculated from the bearing or bearings and the known directional transmission pattern of the transmission sources.

20 Claims, 3 Drawing Sheets

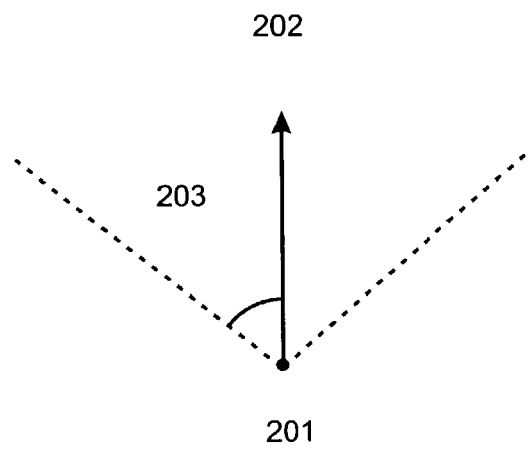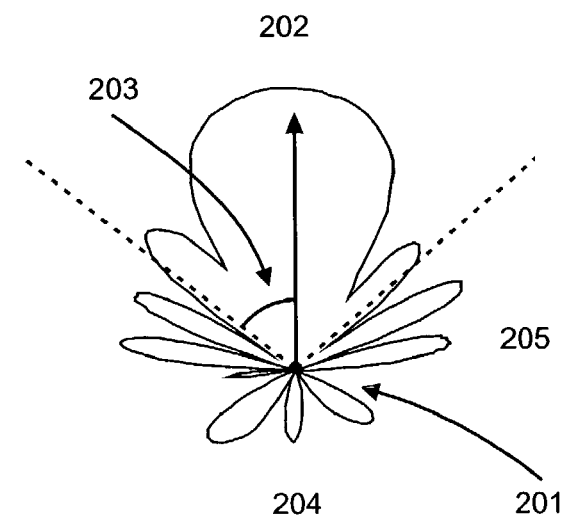
Figure 2a                    Figure 2b

LOCATION SYSTEMS AND METHODS

BACKGROUND OF THE INVENTION

1. Field of the Invention

The present invention relates to receiver location systems in general and, more particularly, to positioning systems for mobile radio receivers in networks of transmitters.

2. Description of the Related Art

There are many systems known in the art by which the position of a receiver can be determined. One such method, when applied to the Global System for Mobiles (GSM), is known by its standardised acronym as E-OTD (Enhanced-Observed Time Difference), which uses the relative timing offsets of signals received from transmitters by a mobile terminal together with the relative timing offsets of the same signals received by a fixed receiver whose position is known. The second set of measurements by the fixed receiver is required since the transmissions may not be synchronised with respect to each other so that their relative transmission time offsets (i.e. the offsets in the times at which identical parts of the signals are transmitted from different transmitters) are constantly varying and otherwise unknown. A similar method, when applied to the Universal Mobile Telecommunication System (UMTS), is known by the acronym OTDOA (Observed Time Difference of Arrival).

Two principal, and different, methods of using the timing offsets in the position computation have been described in the art. In one e.g. EP-A-0767594, WO-A-9730360, U.S. Pat. No. 6,108,553 and AU-B-716647, the details of which are hereby incorporated by reference, the signals measured by the fixed receiver are used, in effect, to 'synchronise' the transmissions from the different transmitters. The instantaneous transmission time offsets of each transmitter relative to its neighbours are calculated from the values measured at the fixed receiver using the known positions of the fixed receiver and the transmitters. The timing offsets measured by the mobile station can then be used in a calculation based on well-known standard techniques in which the points of intersection of two or more hyperbolic position lines predict the position of the mobile station.

The other method, see our EP-B-0303371, WO-A-8901637, U.S. Pat. No. 6,094,168 and EP-A-1025453, WO-A-9921028 (U.S. Ser. No. 09/529,914) the details of which are hereby incorporated by reference and which refer to a system known as Cursor®, makes use of the measurements made by both the fixed receiver and the mobile station to calculate the relative time difference between the signals received from each transmitter by both receivers. This results in a calculation based on the intersection of circles centred on the transmitters.

All E-OTD systems, and OTDOA systems, require the measurement of the times of arrival of radio signals from at least three transmitters at both the mobile station (MS) and at least one other receiver, each radio receiver having its own internal clock. In the GSM system, the transmitters are known as Base Transceiver Stations (BTSs) and the fixed receivers are known as Location Measurement Units (LMUs). The signals from each BTS within range of the MS are received both by the MS itself and by one or more LMUs. Our applications WO-A-9921028 (U.S. Ser. No. 09/529,914) and WO-A-0073813 (U.S. Ser. No. 09/830,447), the contents of each of which are hereby incorporated by reference, describe how the measurements made by a network of LMUs may be combined together to provide a list of the measurements which would have been produced by a single LMU, the virtual LMU or VLMU, at a given location which could have received the signals from all the transmitters.

In these (and other similar) systems, measurement of the time of arrival of a signal from a transmitter is key. In real radio systems many copies of the same transmitted signal arrive at the receiver, each having traversed a different path and arriving with a different time delay; this is known as multipath propagation. Making timing measurements in the presence of multipath signals can be problematic because of the receipt of plural signal copies. The shortest path between a transmitter and a receiver is the line of sight (LOS) path. In practice the radio channel, and hence the radio path, between the transmitter and the receiver is complicated because of reflection, refraction and diffraction of signals between transmission and reception.

An example of both signal reflection and refraction by buildings is shown in FIG. 1, which depicts three MSs 101, 102 and 103, a transmitter 104 and buildings 105 and 106. In this case each MS receives only one copy of the transmitted signal. In most practical cases the signal not only propagates along a direct LOS path, e.g. to MS 101, but encounters obstacles such as buildings 105 and 106 causing additional reflected paths, such as that shown to MS 102, or refracted paths, such as that shown to MS 103. The reflected and refracted signal paths are always longer than the LOS path and so arrive later. If the arrival time, or arrival time relative to a reference of an appropriate type, of a transmitted signal is to be used to compute the position of the receiver, it can be important to use the earliest arriving copy, preferably the LOS copy. The first arriving signal at an MS may not necessarily be the LOS signal if there is obstruction between the transmitter and the receiver such that there is no LOS signal.

A vertically oriented antenna may be directional or omni-directional in the horizontal plane. FIG. 2a depicts a model of a directional antenna 201 in plan view, the plane of the page representing the antenna's horizontal plane. Antenna 201 transmits into a sector, which is modelled by the direction 202 of the centre of the sector (usually in degrees clockwise from north) and the half power angle 203 of the sector. This model is a simplification of the observed horizontal radiation pattern of a real directional antenna, an example of which is shown in FIG. 2b. The simplified model has the back-lobe 204 and side-lobes 205 removed. Hereafter the simplified model of a directional transmitter depicted in FIG. 2a will be referred to, but any complications arising from the simplifications will be discussed when they occur.

A cell of a cellular communications network corresponds to the area served by one antenna. Where the antenna has an omni-directional pattern it is situated at the centre of the cell. However, it is common to co-locate several antennas on the same site, and in this case the antennas are directional, each covering separate adjacent cells. For example, in GSM, several directional antennae (usually three) can be situated at the same site, each transmitting on a different frequency in a specified direction with a specified beam width. A signal transmitted entirely away from an MS clearly cannot be received by that MS along a LOS path. Therefore the use of the relative time of arrival of that signal in the computation of the position of the MS would lead to error. (In practise, there is always a small probability that the signal received in such circumstances has come directly from a side- or back-lobe of the transmitting antenna.) A more accurate position of the MS is obtainable using the method of the invention, which takes into account the directionality of some of the transmitters in a cellular network.

SUMMARY OF THE INVENTION

According to the invention there is provided a method of calculating the position or state of motion of one of at least two terminals each having a receiver capable of making measurements of signals received from one or more transmission sources for use in calculating the unknown position or state of motion of the one terminal, at least one transmission source having a known directional transmission pattern, in which the bearing from one of the receivers of the or each transmission source having a known directional transmission pattern is estimated, and weights are assigned to the measurements made by the one receiver, the weights being calculated from said bearing or bearings and the known directional transmission pattern of the or each transmission source.

The invention also includes apparatus for calculating the position or state of motion of one of at least two terminals each having a receiver capable of making measurements of signals received from one or more transmission sources for use in calculating the unknown position or state of motion of the one terminal, at least one of the transmission sources having a known directional transmission pattern, the apparatus including a processor for estimating the bearing from one of the receivers of the or each transmission source having a known directional transmission pattern, and for assigning weights to the measurements made by the one receiver, the weights being calculated from said estimated bearing or bearings and the known directional transmission pattern of the or each transmission source.

BRIEF DESCRIPTION OF THE DRAWINGS

The invention may be further understood by reference to the accompanying drawings, in which:

FIG. 2a shows a directional antenna model, in the horizontal plane;

FIG. 2b shows an example of the observed radiation pattern of a directional antenna, in the horizontal plane.

DETAILED DESCRIPTION OF THE EXEMPLARY EMBODIMENTS

Figure 1:
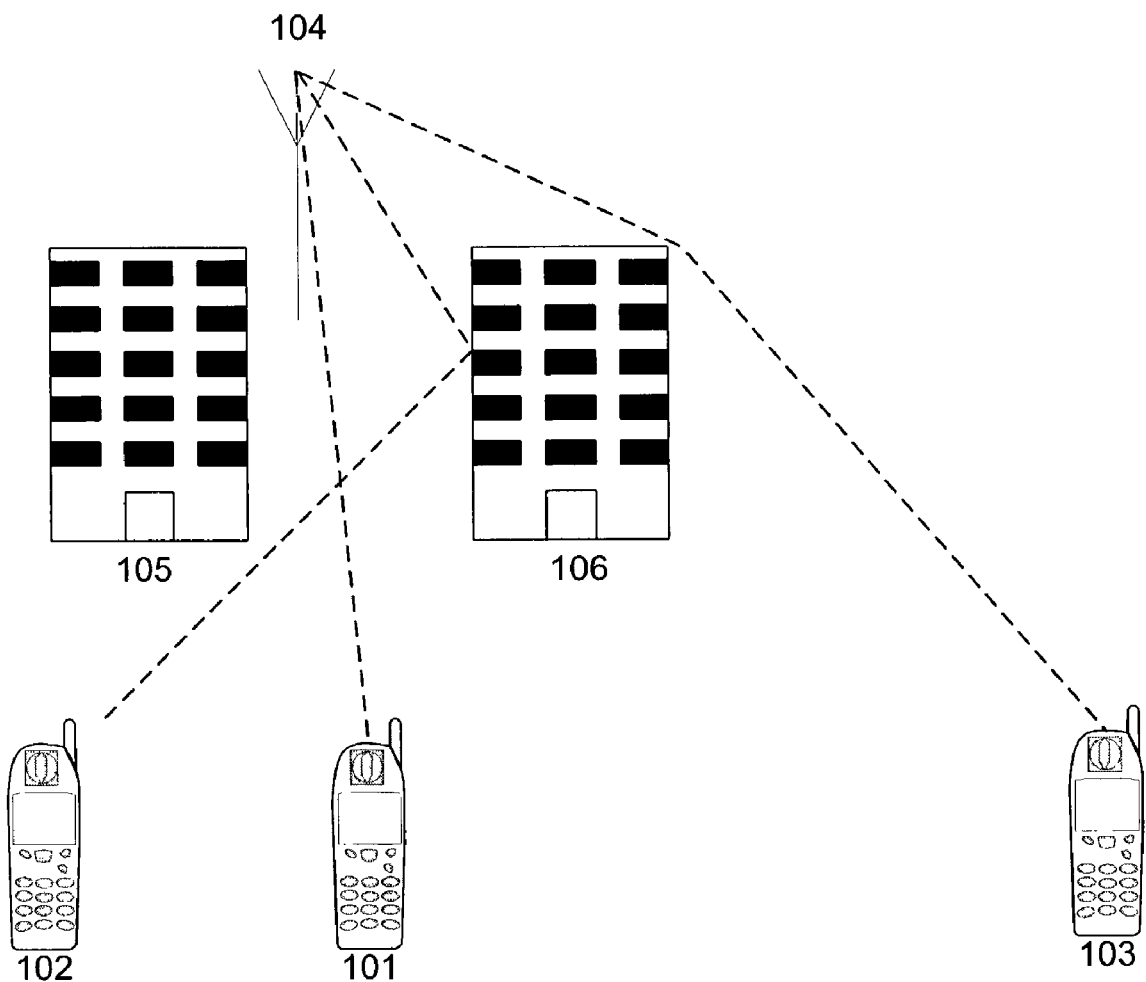
FIG. 1 shows LOS, reflected and refracted radio propagations paths.

According to the invention there is provided a method of calculating the position or state of motion of one of at least two terminals each having a receiver capable of making measurements of signals received from one or more transmission sources for use in calculating the unknown position or state of motion of the one terminal, at least one transmission source having a known directional transmission pattern, in which the bearing from one of the receivers of the or each transmission source having a known directional transmission pattern is estimated, and weights are assigned to the measurements made by the one receiver, the weights being calculated from said bearing or bearings and the known directional transmission pattern of the or each transmission source.

The invention also includes apparatus for calculating the position or state of motion of one of at least two terminals each having a receiver capable of making measurements of signals received from one or more transmission sources for use in calculating the unknown position or state of motion of the one terminal, at least one of the transmission sources having a known directional transmission pattern, the apparatus including a processor for estimating the bearing from one of the receivers of the or each transmission source having a known directional transmission pattern, and for assigning weights to the measurements made by the one receiver, the weights being calculated from said estimated bearing or bearings and the known directional transmission pattern of the or each transmission source.

In a given environment, such as that found in an urban area, the particular paths by which transmitted signals reach the terminal may not be known. However, it may be possible to estimate the relative probability of reception via a direct path, rather than by the reflection of a signal radiated from the transmission source in a direction away from the terminal, and the weight may be assigned to the measurement of the received signal in proportion to this probability according to this invention. This estimation can therefore take account of the relationship between the radiation pattern of the transmission source and the bearing of the transmission source from the receiver. For example, a simple model may describe the strength of the radiation as uniform in the forward directions lying between the two half-power angles, and zero in other directions. In the case that the bearing line lies between the two half angles, a probability of one may be assigned. Otherwise, the assigned probability may be zero. In a particular case, the weight may be equal to the probability, for example it may be set to one in the case where it is certain that the signal is received directly. However, even reflected signals may give useful information, and the weightings applied to the measurements of those signals may be increased above zero.

The directional characteristics of the transmission source need not be accurately known, it being sufficient in many cases to know only the direction of the main lobe and its beam width. The positions of both the receiver and each transmission source must be known at least approximately.

More generally, the weight may be set to be dependent upon the direction of the main lobe of the transmission source, the beam-width (between the half-power angles) of the main lobe, and the bearing of the transmitter relative to the receiver. Where details of the actual transmitter pattern are known, the effects of back- and side-lobes may be taken into account, usually increasing the weighting especially where there is significant radiation in the backwards direction.

The one receiver is part of the one terminal or of the other of the terminals.

The relative probability of reception at the receiver via a direct path, rather than by the reflection of a signal radiated from the transmission source in a direction away from the receiver is preferably estimated, and the weight can be assigned to the measurement of the received signal in proportion to this probability.

The strength of the signal radiation transmitted from a transmission source may be defined as uniform in the forward directions lying between its two half-power angles, and zero in other directions.

If the bearing lies between the two half angles, a probability of one can be assigned as the relative probability of reception at the receiver via a direct path and if the bearing lies between the two half angles, a probability of zero can be assigned.

The assigned weight may be equal to the probability.

Preferably, the signal measurements are measurements of the time of arrival of particular features of the signals, measured with respect to a clock within the receiver, or to an external clock, or with respect to the arrival of signals from another transmitter.

Alternatively or additionally, the signal measurements are measurements of one or more of the signal strength, the frequency offset caused by motion of either the transmitter or receiver, and the phase of the received signals.

The method may be used for calculating the position or state of motion of two or more terminals each having a receiver capable of making measurements of signals received from one or more transmission sources for use in calculating the unknown position or state of motion of the terminals, in which case the bearing from each of the receivers of the or each transmission source having a known directional transmission pattern is estimated, and weights are assigned to the measurements made by each receiver. The positions or states of motion of the two or more terminals may be calculated simultaneously.

The apparatus of the invention may be a terminal in a cellular telecommunications system, which includes a processor adapted to carry out the method defined above and that terminal may be either a handset for a telecommunications network or a fixed receiver of a digital telecommunications network.

It will be apparent that the method of the invention is widely applicable to transmitters and signals of any variety. Preferably, the transmission sources form part of a network, more preferably part of a cellular communications network, but they may also be transmission sources set up for any other purpose. The signals from the transmission sources may be radio digital telecommunication signals, for example GSM, CDMA or UMTS signals, or they may be signals of any other type, for example broadcast signals, such as for radio or television. In some applications, the signals may be infra-red, light, or other electromagnetic signals, or they may be sound waves travelling in air or other sound-bearing medium.

The measurements are preferably measurements of the time of arrival of particular features of the signals, measured with respect to a clock within the receiver, or to an external clock, or with respect to the arrival of signals from another transmitter. The measurements may also be measurements of any other aspect of the received signals, for example the signal strength, or the frequency offset caused by motion of either the transmitter or receiver, or the phase of the received signals.

The invention has particular application to the estimation of the position of a mobile receiver in a telecommunications network. The approximate location of the mobile receiver is preferably determined using the timing offsets of the signals received, these timing offsets being relative to an internal clock of the mobile receiver, relative to an external clock or relative to the time of arrival of another received signal. The timing offsets of the signals may be determined using readily identifiable signal structures, which are repeated at predictable or predetermined intervals in time, each repeat being singularly identifiable from other information contained within the signal, such as by frame numbering. Examples of readily identifiable signal structures are the training sequences in GSM, the pilot spreading codes in CDMA and the field synchronisation segments in each data frame of digital TV signals. The invention may also be applied to receivers at known locations, such LMUs in known E-OTD systems; the timing offsets of the signals received by the receivers at known locations are measured relative to an internal clock of the receiver, relative to an external clock or relative to the time of arrival of another received signal, and weighted in accordance with the invention.

An example of the invention will now be described with reference to the accompanying drawings.

The following example of the invention relates to the cellular GSM system. A GSM transceiver site usually has three directional transmission sources, each known as a Base Transceiver Station (BTS), transmitting in a known direction and beam width. The beam width is usually a little over the 120° necessary to ensure onmidirectional coverage by the set of three BTSs. The signal radiated at any moment by each BTS depends on the particular configuration of the system and on the amount of traffic at that moment. However, even in quiet conditions the Broadcast Control Channel (BCCH) will be broadcasting one burst in every frame. Each BTS has an identity, called the Base Station Identity Code (BSIC) which it transmits on the BCCH. A GSM mobile station (MS) periodically cycles through the BCCHs received from the surrounding BTSs. When a location request is received, either from the MS or elsewhere, the MS measures the relative time of arrival, with respect to other MSs or to the MS internal clock, of the signals from all BTSs, and associates each arrival time with the BTS from which the signals originated, by using the BSIC. The MS location is calculated from the timings using a database of transmitter information, including the position, beam width, direction and identity of each transmitter of the network. Additionally the MS location calculation may include timing measurements taken from LMUs.

Figure 3:
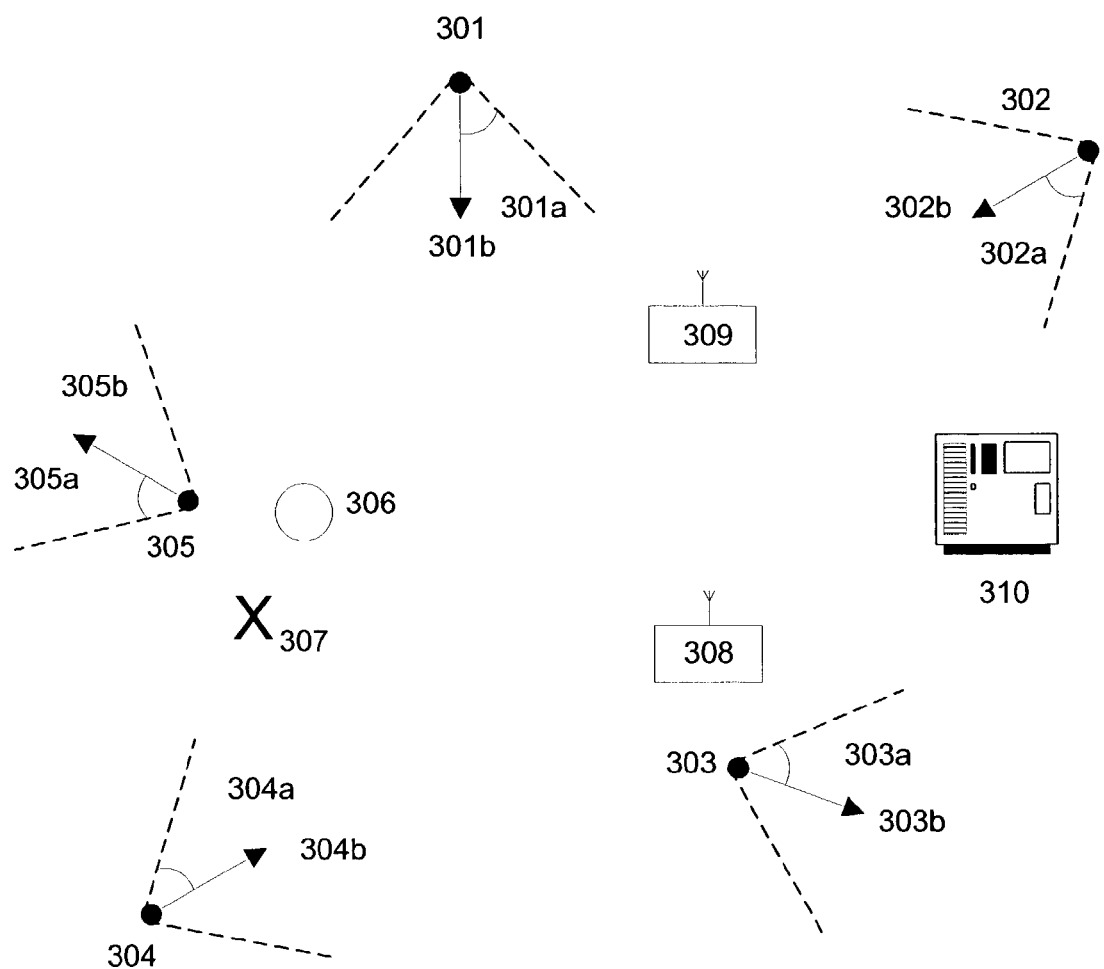
FIG. 3 shows network transmitters, LMUs and example MS locations.

Referring now to FIG. 3, the timing measurements made by the MS (not shown) along with the positions of BTSs 301, 302, 303, 304, 305 are used to calculate a coarse location 306 of the MS using an E-OTD method. The direction 301*b*, 302*b*, 303*b*, 304*b*, 305*b* and beam half-width (half that between two half-power angles 301*a*, 302*a*, 303*a*, 304*a*, 305*a*) of each uniquely identified BTS is used to determine which BTSs are transmitting towards the MS coarse position 306. In this example, the BTSs 301, 302 and 304, are transmitting towards the MS, and the corresponding timing measurements made on these signals are then allocated higher weights than the weights allocated to BTSs which point away, e.g. 303, in the subsequent calculation of the more-accurate MS position 307. This is illustrated by the table fragment (Table 1 below) where the BTS identity, timing offset measured by the MS (relative to the serving cell 304), and assigned weight are shown. Although BTSs 303 and 305 radiate in directions away from the MS coarse position 306, the measurements made using those signals nevertheless carry useful information as mentioned above. They are therefore assigned weights greater than zero, according to their importance in constraining the accuracy of the more-accurate position solution, but less than the unity weighting assigned to the measurements of the signals from the directly-received BTSs 301, 302 and 304. For example, the BTS 303 is assigned a weight of 0.22 corresponding to the average probability of measurements made on the signals from a BTS in that relative configuration, which in this case has been predetermined by calibration across the network as a whole. The coarse position 306 is close enough to BTS 305 to be considered, by pre-calibration, able to receive signals from the back lobe, so the corresponding measurement is allocated a higher weighting in the table. (The relative receive timings are not proportional to the distances between the BTSs and the MS both because of multipath propagation and the lack of synchronisation of BTSs in the GSM system.)

TABLE 1

| BTS i.d. (BSIC) | Reference in FIG. 3 | Relative Timing to Serving BTS (in ps) | Assigned Weight |
| --- | --- | --- | --- |
| 40021 | 301 | 1.768 | 1.00 |
| 41392 | 302 | −4.713 | 1.00 |
| 62189 | 303 | 3.268 | 0.22 |
| 51384 | 304 | 0.000 | 1.00 |

TABLE 1-continued

| BTS i.d. (BSIC) | Reference in FIG. 3 | Relative Timing to Serving BTS (in ps) | Assigned Weight |
|---|---|---|---|
| 21611 | 305 | 1.222 | 0.88 |
| — | | | |
| — | | | |

In the example above, the calculation of the location of the MS is carried out in computing means 310 which may be located anywhere convenient, provided it is in communication with the MS and the LMU or VLMU. The computing means may be located in the MS.

Timing measurements taken by LMUs 308 and 309 may also be weighted in accordance with the invention. In this case the directions 301*b*, 302*b*, 303*b*, 304*b*, 305*b* and beam half-widths (half that between two half-power angles 301*a*, 302*a*, 303*a*, 304*a*, 305*a*) of each uniquely-identified BTS are then used to determine which BTSs are transmitting towards the known LMU positions 308 and 309, and the corresponding timing measurements made on signals transmitted from these BTSs are then allocated higher weights accordingly.

The method of the invention may be applied to the measurements made by some or all MSs, and/or some or all LMUs.

The particular example of the invention described above refers to the E-OTD method of calculating the MS position, but the method of the invention may find application in any known positioning method which uses received signal timings or other aspects of the received signals, such as the signal power.

The invention claimed is:

1. A method of calculating the unknown position or state of motion of a mobile terminal, wherein said mobile terminal is one of at least two terminals, each of said at least two terminals having a receiver for receiving signals from base transceiver stations, and in which the relative timing offsets of signals from said base transceiver stations received by said at least two terminals are used in a determination of the location of said mobile terminal, said base transceiver stations having known directional transmission patterns, and the method comprising:
   estimating, at said mobile terminal, a bearing or bearings respectively of one or more of said base transceiver stations from said mobile terminal, and
   assigning weights to measurements of at least some of the relative timing offsets of the received signals made by said mobile terminal and using said weighted measurements in accordance with their weighting for said determination of the position or state of motion of said mobile terminal using the relative timing offsets of signals from said base transceiver stations received by said at least two terminals, said weights being calculated from said bearing or bearings and the known directional transmission pattern of the or each of said base transceiver stations.

2. A method according to claim 1, wherein the receiver is part of said mobile terminal.

3. A method according to claim 1, further comprising estimating the relative probability of reception of the signals from one of said base transceiver stations at said mobile terminal via direct and reflected paths, and assigning said relative probability of reception via the direct path as the weight to be applied to the measurements of the received signals.

4. A method according to claim 3, in which the strength of the signal radiation transmitted from at least one of said base transceiver stations is defined as uniform in the forward directions lying between its two half-power angles, and zero in other directions.

5. A method according to claim 3 or claim 4, in which, if the bearing lies between the two half angles, a probability of one is assigned as the relative probability of reception at said mobile terminal via a direct path and if the bearing lies between the two half angles, a probability of zero is assigned.

6. A method according to claim 3 or claim 4, in which the assigned weight is equal to the probability.

7. A method according to claim 1, wherein the signal measurements include measurements of the time of arrival of particular features of the signals, measured with respect to a clock within said mobile terminal, or to an external clock, or with respect to the arrival of signals from another one of said base transceiver stations.

8. A method according to claim 1, wherein the signal measurements include measurements of one or more of the signal strength, the frequency offset caused by motion of either one of said base transceiver stations or said mobile terminal, and the phase of the received signals.

9. A terminal in a cellular telecommunications system, including a processor adapted to carry out the method of claim 1.

10. A handset for a telecommunications network including a terminal according to claim 9.

11. A fixed receiver of a digital telecommunications network including a terminal according to claim 9.

12. A method of calculating the unknown position or state of motion of two or more mobile terminals, each of said mobile terminals having a receiver for receiving signals received from base transmitter stations, and in which the relative timing offsets of signals from the base transmitter stations received by said mobile terminals are used in a determination of the location of said mobile terminals, said base transmitter stations having known directional patterns, and the method comprising:
   estimating, using at least one of said mobile terminals, a bearing or bearings respectively of one or more of said base transmitter stations from said at least one of said mobile terminals, and
   assigning weights to measurements of at least some of the relative timing offsets of the received signals made by each of said mobile terminals and using said weighted measurements in accordance with their weighting for said determination of the position or state of motion of said mobile terminal using the relative timing offsets of signals from said base transceiver stations received by said at least two terminals, said weights being calculated from said bearing or bearings and the known directional transmission pattern of the or each of the said base transmitter stations.

13. A method according to claim 12, wherein the positions or states of motion of at least two of said mobile terminals are calculated simultaneously.

14. Apparatus for calculating the unknown position or state of motion of a mobile terminal, wherein said mobile terminal is one of at least two terminals, each of said at least two terminals having a receiver for receiving signals from base transceiver stations, and in which the relative timing offsets of signals from said base transceiver stations received by said at least two terminals are used in a determination of the location of said mobile terminal, said base transceiver stations having known directional transmission patterns, and the apparatus comprising a processor for estimating, at said mobile terminal, a bearing or bearings respectively of one or more of said base transceiver stations from said mobile terminal, and for assigning weights to measurements of at least some of the relative timing offsets of the received signals made by said mobile terminal and using said weighted measurements in accordance with their weighting for said determination of the position or state of motion of said mobile terminal using the relative timing offsets of signals from said base transceiver stations received by said at least two terminals, said weights being calculated from said estimated bearing or bearings and the known directional transmission pattern of the or each of said base transceiver stations.

15. A handset for a telecommunications network including apparatus according to claim 14.

16. A fixed receiver of a digital telecommunications network including apparatus according to claim 14.

17. A method of calculating the unknown position or state of motion of a mobile terminal, wherein said mobile terminal is one of at least two terminals each having a receiver for receiving signals from transmission sources, and in which the relative timing offsets of signals from said transmission sources received by said at least two terminals are used in a determination of the location of said mobile terminal, at least one transmission source having a known directional transmission pattern and the method comprising:

estimating, at one of said receivers, a bearing or bearings respectively of one or more of said transmission sources from said one of the receivers, and assigning weights to measurements of at least some of the relative timing offsets of the received signals made by said one receiver, said weights being calculated from said bearing or bearings and the known directional transmission pattern of the or each of said transmission sources; and estimating the relative probability of reception of the signals from one of said base transceiver stations at said mobile terminal via direct and reflected paths, and assigning said relative probability of reception via the direct path as the weight to be applied to the measurements of the received signals and using said weighted measurements in accordance with their weighting for said determination of the position or state of motion of said mobile terminal using the relative timing offsets of signals from said base transceiver stations received by said at least two terminals.

18. A method according to claim 17, in which the strength of the signal radiation transmitted from a transmission source is defined as uniform in the forward directions lying between its two half-power angles, and zero in other directions.

19. A method according to claim 17 or claim 18, in which, if the bearing lies between the two half angles, a probability of one is assigned as the relative probability of reception at the receiver via a direct path and if the bearing lies between the two half angles, a probability of zero is assigned.

20. A method according to claim 17 or claim 18, in which the assigned weight is equal to the probability.

* * * * *